Feb. 22, 1927.  
G. W. GRIFFITH  
LIFTING DEVICE  
Filed April 26, 1926  
4 Sheets-Sheet 3  
1,618,923
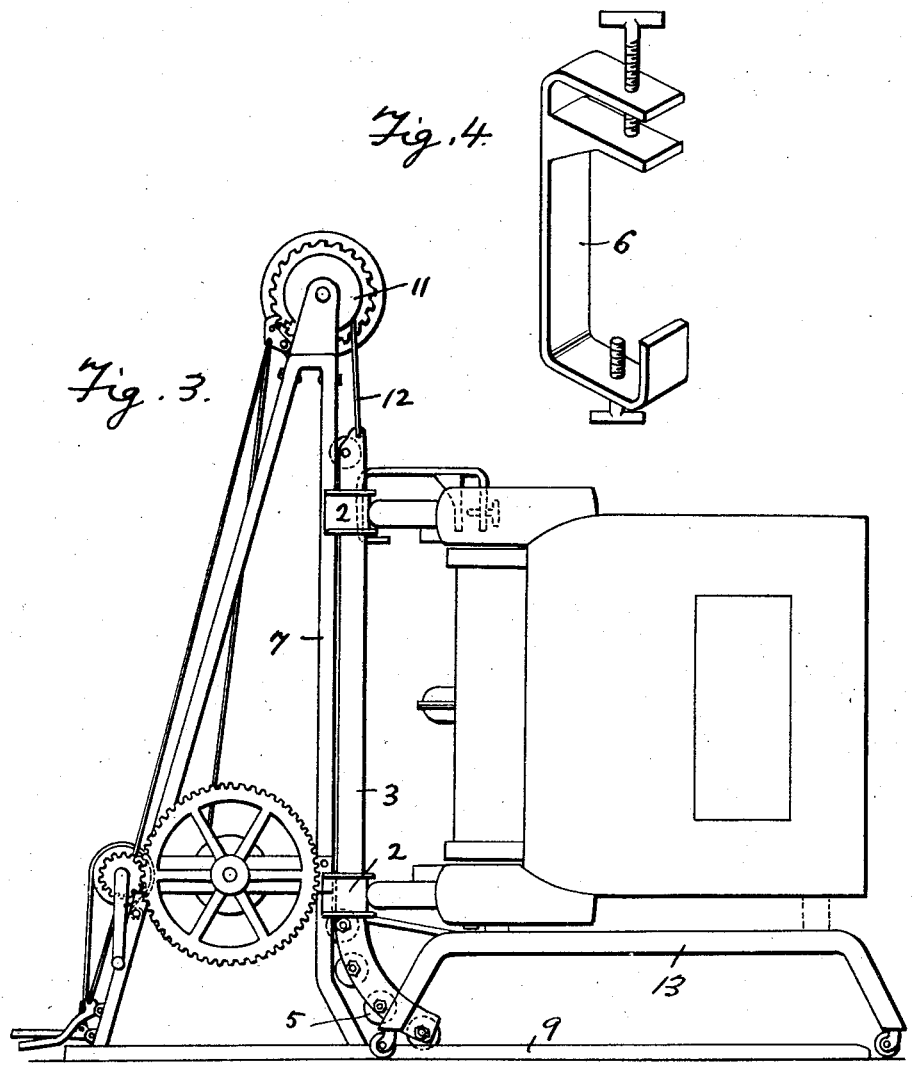
George W. Griffith.
INVENTOR
BY Victor J. Evans
ATTORNEY
WITNESS: Gerald Hennesy Patented Feb. 22, 1927.

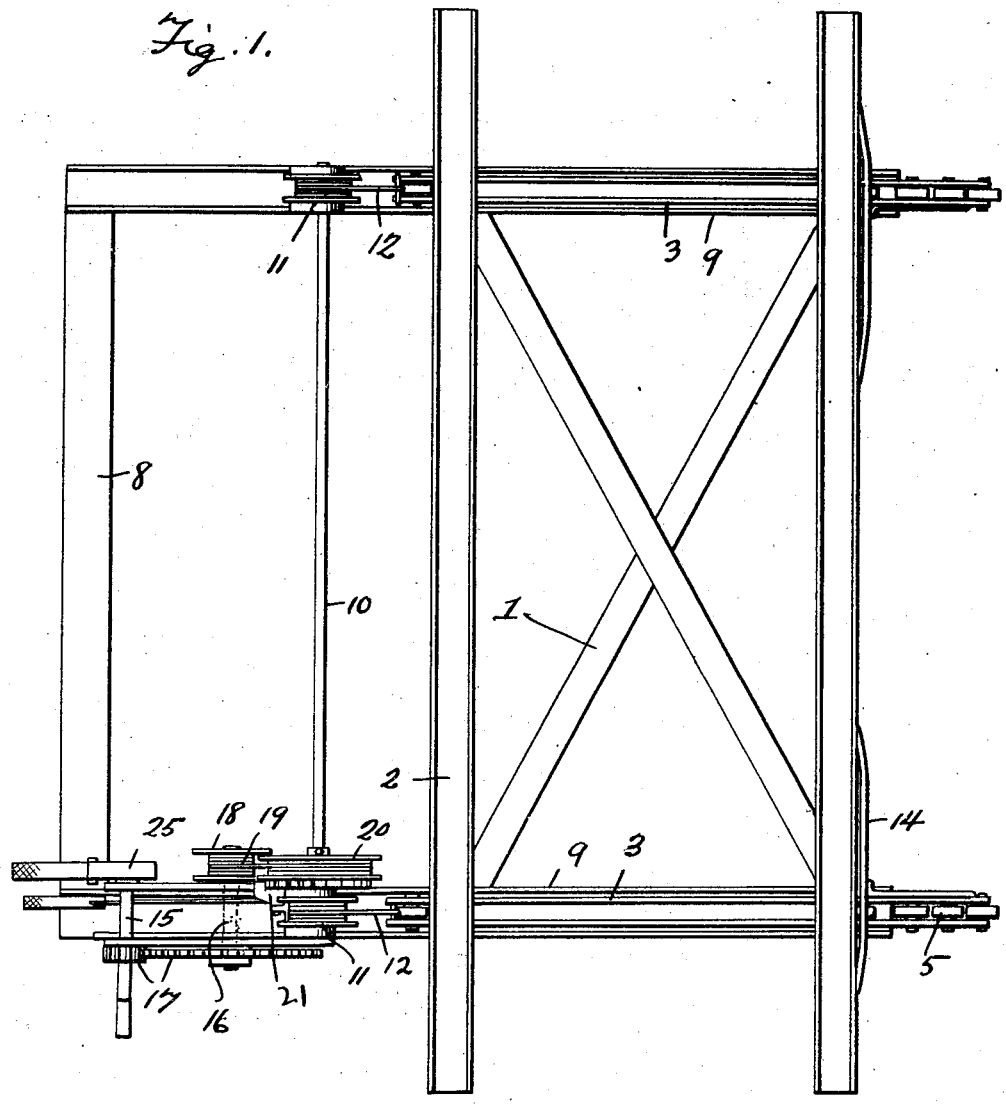

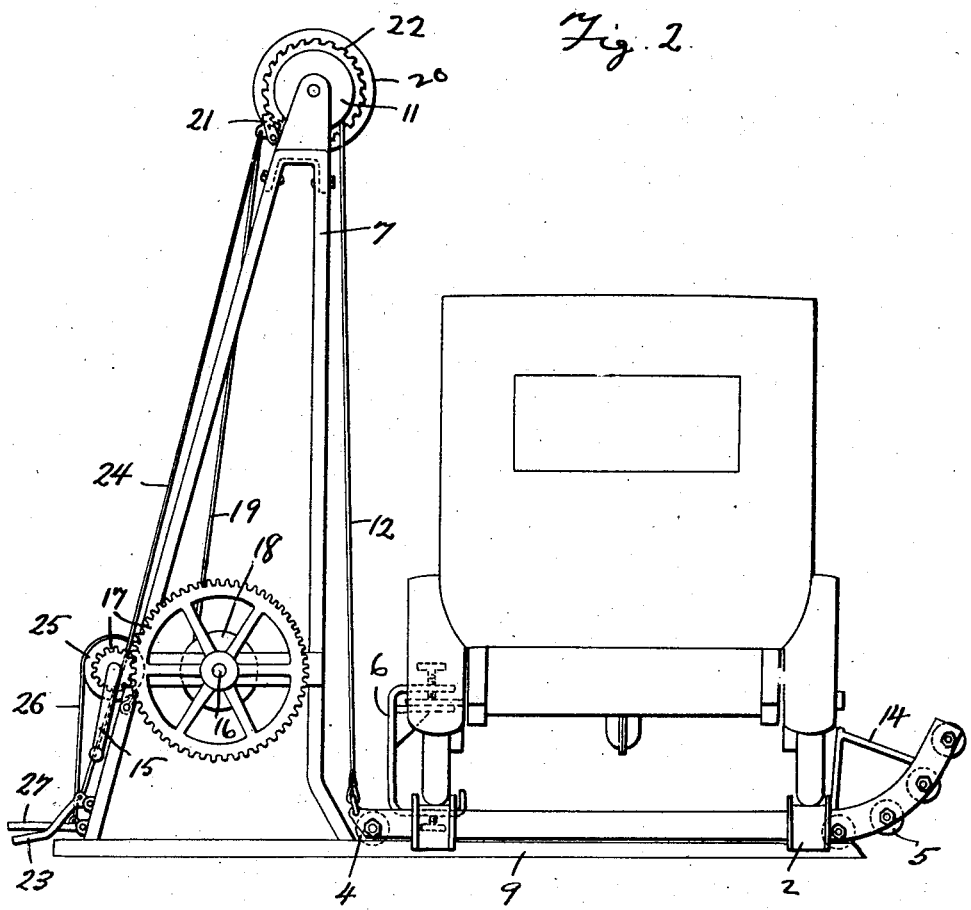

1,618,923

UNITED STATES PATENT OFFICE.

GEORGE W. GRIFFITH, OF LAUREL, NEBRASKA, ASSIGNOR TO EDNA MOLES GRIFFITH, OF LAUREL, NEBRASKA.

LIFTING DEVICE.

Application filed April 26, 1926. Serial No. 104,747.

This invention relates to a lifting device for motor vehicles and the like, the general object of the invention being to provide means for turning the vehicle upon its side while lifting it off the floor so that the under parts of the vehicle are made accessible to a repair man or other person and without necessitating him lying down under the vehicle.

Another object of the invention is to provide means for supporting the vehicle from the floor after it has been raised and turned.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a plan view of the invention.

Figure 2 is an end view thereof showing an automobile thereon.

Figure 3 is a view similar to Figure 2, but showing the automobile in lifted position.

Figure 4 is a view of one of the clamps for holding the automobile on the track or platform.

Figure 5:
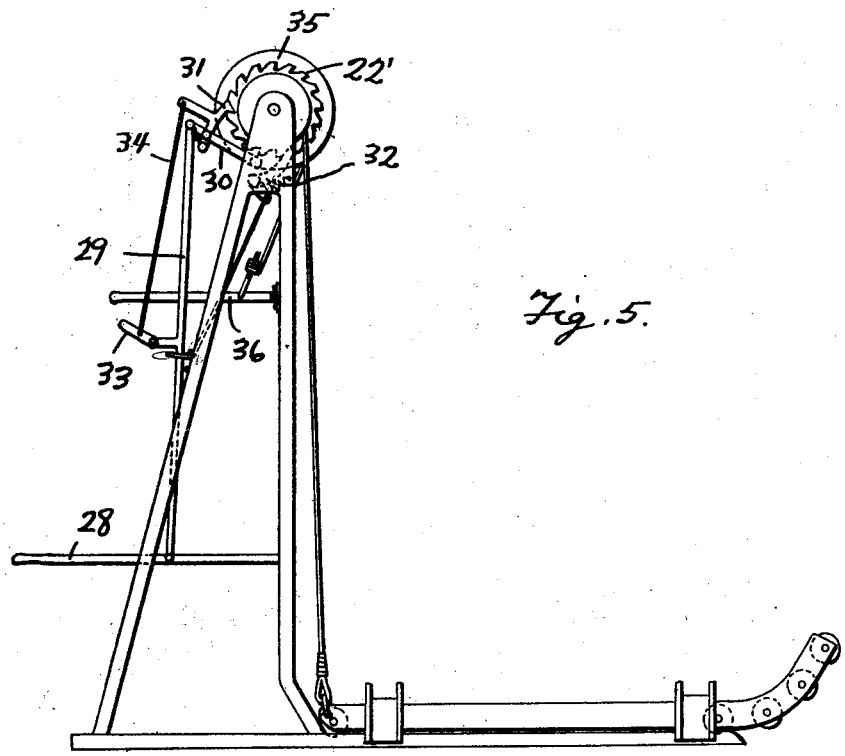
Figure 5 is an end view of a modification.

In these views, 1 indicates a track part or platform which is provided with the channel rails 2 to receive the wheels of a vehicle, the cross pieces 3 of the track part each having a wheel 4 at its inner end and a plurality of wheels 5 at its outer end, this outer end being curved, as shown. Clamps, such as shown at 6 in Figure 4, are used to clamp the running board or other part of an automobile or vehicle to the inner rail 2, as shown in Figures 2 and 3, so that the vehicle is fastened to the track part. An upright 7 of inverted V-shape is placed adjacent one end of each of the cross pieces 3 of the track part and the uprights are connected together by the cross pieces 8 and rail forming beams 9 form rests for the uprights and have extensions which are engaged by the wheels of the cross pieces 3 of the track part. The front or inner limb of each upright 7 is of channel shape in cross section and forms a vertical continuation of the rail beam 9 so that the wheels of the cross pieces 3 can pass from the rails 9 onto said front pieces of the uprights 7. A shaft 10 has its ends journaled in the upper ends of the uprights and a drum 11 is arranged at each end of the shaft. A cable 12 is carried by each drum and each cable is fastened to the inner end of a cross piece 3 of the track part so that when the shaft is rotated to wind the cables on the drums, the track part will be pulled off the beams 9 up the rail forming portions of the uprights, as shown in Figure 3, so that the vehicle fastened to the track part will be turned on its side, as shown in Figure 3. A wheeled frame, such as that shown at 13, can then be moved under the vehicle to help support it in this position, as also shown in Figure 3.

Figures 1, 2 and 3 show means for rotating the shaft which consists of a crank 15 journaled in the lower part of one of the uprights and connected to a shaft 16, journaled in said upright, by the gears 17, said shaft 16 having a drum 18 thereon which carries a cable 19 which passes over a drum 20 on the shaft 10, this cable being arranged so that as it is wound upon the drum 18, it will unwind from the drum 20, thus rotating said drum 20 and the shaft 10 and its drums so as to wind the cables 12 on the drums 11. A dog 21, engaging a ratchet 22 on the drum 20, acts to hold the parts against retrograde movement, but said dog can be released to permit the weight of the track part and the vehicle to unwind the cables so that the track part can return to horizontal position, by means of a foot pedal 23 at the base of the upright and connected with the dog by the link 24. The crank shaft 15 carries a brake drum 25, the band 26 of which is manipulated by the foot pedal 27, this brake checking the descent of the track part and vehicle after the dog 21 has been released from the ratchet.

Figure 6:
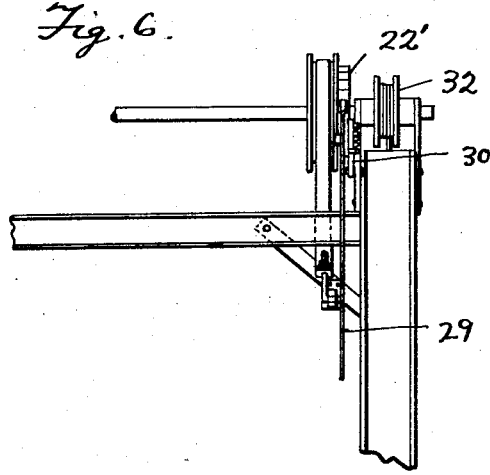
Figure 6 is a fragmentary side view of Figure 5.

Figures 5 and 6 show a modification for rotating the shaft 10. In this form, the shaft is rotated through means of a hand lever 28, link 29, pivoted arm 30 and the dog 31 on the arm engaging the ratchet 22'. Thus by rocking the lever 28, the dog and ratchet will give the shaft a step by step movement. A second dog 32 holds the parts against retrograde movement. When the parts are to be lowered, a small hand lever 33 on the link 29 is manipulated which will move the dog 31 into inoperative position through the link 34. The brake 35 is manipulated by a hand lever 36. In other respects, this form of the device is similar to that before described.

It will, of course, be understood that power driven means can be used to operate the device instead of hand operated means.

From the foregoing, it will be seen that I have provided simple means for lifting a vehicle off the floor and turning it upon its side so that the parts underneath are readily accessible and the workmen can stand in an upright position in working upon the under parts.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a track part for receiving a vehicle, an upright frame having rails at the front thereof, wheels on the track part for engaging the rails, means for fastening a vehicle to the track part, hoisting means connected with the track part for pulling the same off the floor and up the rails of the uprights to turn the vehicle upon its side while lifting the same and a wheeled frame adapted to be placed under the vehicle to support the same in lifted position.

2. A device of the class described comprising a pair of rail beams, a track part having curved outer extensions, wheels on said extensions, wheels at the inner ends of the track part, uprights associated with the beams and having rail parts at their front for receiving the wheels of the track part when the track part is lifted, some of said wheels engaging the beams when the track part is in lowered position, means for fastening a vehicle to the track part and hoisting means associated with the uprights and connected with the track part.

In testimony whereof I affix my signature.

GEORGE W. GRIFFITH.